United States Patent
Fiorini

(10) Patent No.: US 10,824,540 B2
(45) Date of Patent: Nov. 3, 2020

(54) TERMINAL FAILURE BUSTER

(71) Applicant: Datalogic IP Tech S.r.l., Calderara di Reno (IT)

(72) Inventor: Daniele Fiorini, Casalecchio di Reno (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 0 days.

(21) Appl. No.: 16/235,870

(22) Filed: Dec. 28, 2018

(65) Prior Publication Data
US 2020/0210321 A1 Jul. 2, 2020

(51) Int. Cl.
G06F 11/36 (2006.01)
G06F 1/16 (2006.01)
G06F 3/0485 (2013.01)
G06F 3/0488 (2013.01)

(52) U.S. Cl.
CPC .......... *G06F 11/3636* (2013.01); *G06F 1/165* (2013.01); *G06F 3/0485* (2013.01); *G06F 3/04883* (2013.01)

(58) Field of Classification Search
CPC .... G06F 1/165; G06F 3/0485; G06F 3/04883; G06F 11/3636
USPC ........................................................ 717/128
See application file for complete search history.

(56) References Cited

U.S. PATENT DOCUMENTS

| | | | |
|---|---|---|---|
| 5,943,498 A | 8/1999 | Yano et al. | |
| 7,342,897 B1 * | 3/2008 | Nader | H04L 43/00 370/241 |
| 8,023,975 B2 | 9/2011 | Wickman et al. | |
| 8,831,687 B1 | 9/2014 | Kotab | |
| 9,697,405 B2 | 7/2017 | Bremer | |
| 2011/0006971 A1 * | 1/2011 | Ebey | G06F 1/1616 345/1.3 |
| 2013/0159771 A1 | 6/2013 | Patel | |
| 2014/0132481 A1 | 5/2014 | Bell et al. | |
| 2015/0046562 A1 * | 2/2015 | Malcolm | G06F 3/0484 709/217 |
| 2015/0278058 A1 | 10/2015 | Kurts et al. | |
| 2017/0109436 A1 * | 4/2017 | Delsordo | H04L 12/66 |
| 2017/0139485 A1 | 5/2017 | Fogelmark et al. | |
| 2017/0286254 A1 | 10/2017 | Menon et al. | |
| 2018/0150386 A1 | 5/2018 | Takabatake et al. | |

FOREIGN PATENT DOCUMENTS

| | | | |
|---|---|---|---|
| JP | H04304534 A | | 10/1992 |
| JP | 2004252921 A | * | 9/2004 |

OTHER PUBLICATIONS

Extended European Search Report corresponding to EP19219226.8, dated May 18, 2020, 8 pages.

* cited by examiner

*Primary Examiner* — Ryan D. Coyer
(74) *Attorney, Agent, or Firm* — Foley & Lardner LLP

(57) ABSTRACT

A system and method may include a mobile electronic device including a primary electronic display and a processor in communication with the primary electronic display. A secondary electronic display may be in communication with the processor. The processor may execute software that, in the event of an execution error of a software program or hardware component, causes at least one message inclusive of information to assist a user with a debugging process to be displayed on the secondary electronic display.

20 Claims, 4 Drawing Sheets

TERMINAL FAILURE BUSTER

BACKGROUND

Developers of software to be executed on a mobile electronic device or mobile device find it increasingly more difficult as operating systems, hardware, and communications protocols have become more advanced and complex. For example, with the inclusion of more hardware, such as cameras, GPS devices, wireless charging devices, fingerprint scanners, and display other hardware in recent years, software conflicts may occur either in the development or at the customer, despite significant test sessions performed during the development itself of the device.

It is not uncommon for the mobile devices to become blocked or locked up and an electronic display of the mobile device to become frozen. In general, an end user is unable to provide enough information to software developers. Even when the issue is shown to the developers, in most cases, it is difficult to extract additional information from the device by the developer, so it is necessary to access evidence inside the device so that a description of the problem may be seen by an end-user, by a field technician, and/or by a software developer. Even in case of the mobile electronic device being examined by the most skilled software designer, it is almost impossible to access useful information from the blocked device to understand the cause of the problem and solve the cause of the failure. That is, when such an event occurs (e.g., frozen screen), a user attempting to debug the software being developed often find him or herself unable to access the device as a result of the electronic display being unresponsive to touch, which may be displaying a white or black screen. In such an event, there is no way to access the mobile device via communications ports, even using debugging or emulation tools currently available for such purposes. Moreover, in the event of the mobile device becoming locked up, a programmer is unable to access registers or stacks to determine fault codes, current state, or any other information that may help a programmer debug a software program.

In some cases where multiple cores are operating on or form a processor, not all cores are dead, but because the state of one or more cores is so bad, the operating system (OS) may not work at all, which causes the electronic display to not be able to show anything since electronic display has to rely on the OS that is no longer working properly. And, because the OS is no longer working properly, there is no means by which a developer can access an internal state of the processor or cores thereof. In some cases, a suspend and resume cycle or reboot cycle may be performed during test sessions of validation or during normal use by a customer. In the event of a white or black screen state occurring, a developer is frustrated because no information can be displayed on the electronic display of the mobile device. And, if a developer is testing one-hundred devices for software stability purposes and only one or a handful of the devices fails, it can be very difficult to determine the exact sequence or cause of a failure of a software program, and reproducing the failure or events that caused the failure may be difficult, as well.

As understood by developers, it is generally not practical to hook up debug equipment to each of the one-hundred devices to capture the specific failure situation, which is often not simply reproducible, over multiple days. Since it is impossible to know in advance in which device the problem will arise, it is impossible to exploit proper instrumentation to monitor the device activity. Moreover, it is impossible to have attached to each device debugging equipment during the lifetime of all the devices. Hence, there are basically two moments: (i) client normally using devices in the field (or technical support or validation team), that is typically performed with a large number if devices and very long observation time without debug instrumentation attached to the devices to perform a suspend and reboot cycle, and (ii) inside the company and after that the problem arises in the field has been communicated to the software development team, where developers have all the necessary instrumentation to try to reproduce the problem over a set of test devices, but even if after a proper time the problem is reproduced, it is possible that the instrumentation was not connected to that specific device.

As understood in the art, the complexity of software and hardware tools used for displaying data, images, video, and windows on an Android device is significant. The software modules of the Android operating system, includes applications, application framework modules, libraries, Linux kernel, and hardware. Moreover, a further set of complex modules used for touchscreen functionality are also complex. Often times, when an exception occurs, the exception is a result of a low-level driver being affected and hanging up, which makes the situation particularly challenging for a developer to determine a cause of the state that locks up the mobile device. It should be understood that other operating systems, such as iOS, windows, and RTOS, have similar complexity and deadlock failure occurrences.

For these reasons, a developer cannot rely on being able to trace the exceptions to obtain error messages to help determine what, if any, components are still active (e.g., to determine what cores are still functioning). In other words, without having access to exceptions, there is no easy way to determine the internal state of the mobile device, especially if the communication stack is not operating. Thus, the developer is often left with no other choice but to reboot the mobile device, if possible, and attempt to make corrections to the program without having much insight or evidence of the failure. Thus, there is a need to have access to exceptions or other failure message information about the state of the mobile device to assist developers in debugging a program that is being developed and executed by the mobile device both during development in the lab and after development when being tested in the field and used by end-users.

SUMMARY

To overcome the problem of mobile devices locking up when developing products, applications, and/or mobile apps and, more often, during usage by a user, such that it is difficult or impossible to determine why the mobile device locked up, a secondary electronic display may be configured to be in communication with the mobile device and be programmed to work in a new operating mode, which is a debug mode. In operation, one embodiment of the debug mode includes the use of software code that includes computer-readable instructions, which may include self-checking code that (i) continually operates on a processor of the mobile device to identify debug assertions (e.g., traps) as part of an error handler system capable of intercepting anomalous situation and (ii) redirects failed assertions or perform error handler management, which are indications when preconditioned call controls are not verified, events, exceptions, to the secondary display. In another embodiment, in the event of the processor including multiple cores, a dedicated core may be devoted for debug purposes, which enables that core to remain alive in the event that one or more other cores fails, and allows for information, such as exceptions, current state, debug traces, etc., that may help a developer determine the cause of a lockup or other failure of the software program.

One embodiment of a system may include a mobile electronic device including a primary electronic display and a processor in communication with the primary electronic display. A secondary electronic display may be in communication with the processor. The processor may execute software that, in the event of an execution error of a software program or hardware component, causes at least one message inclusive of information to assist a user with a debugging process to be displayed on the secondary electronic display.

An embodiment of a method may include executing a software program and self-checking software instructions by a processor of a mobile electronic device including a primary electronic display. The processor may be in communication with the primary electronic display. A secondary electronic display may be executed and in communication with the processor. The processor may be configured to execute the self-checking software instructions such that in the event of an exception occurring, the processor may be caused to display at least one message inclusive of information to assist a user with a debugging process on the secondary electronic display.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
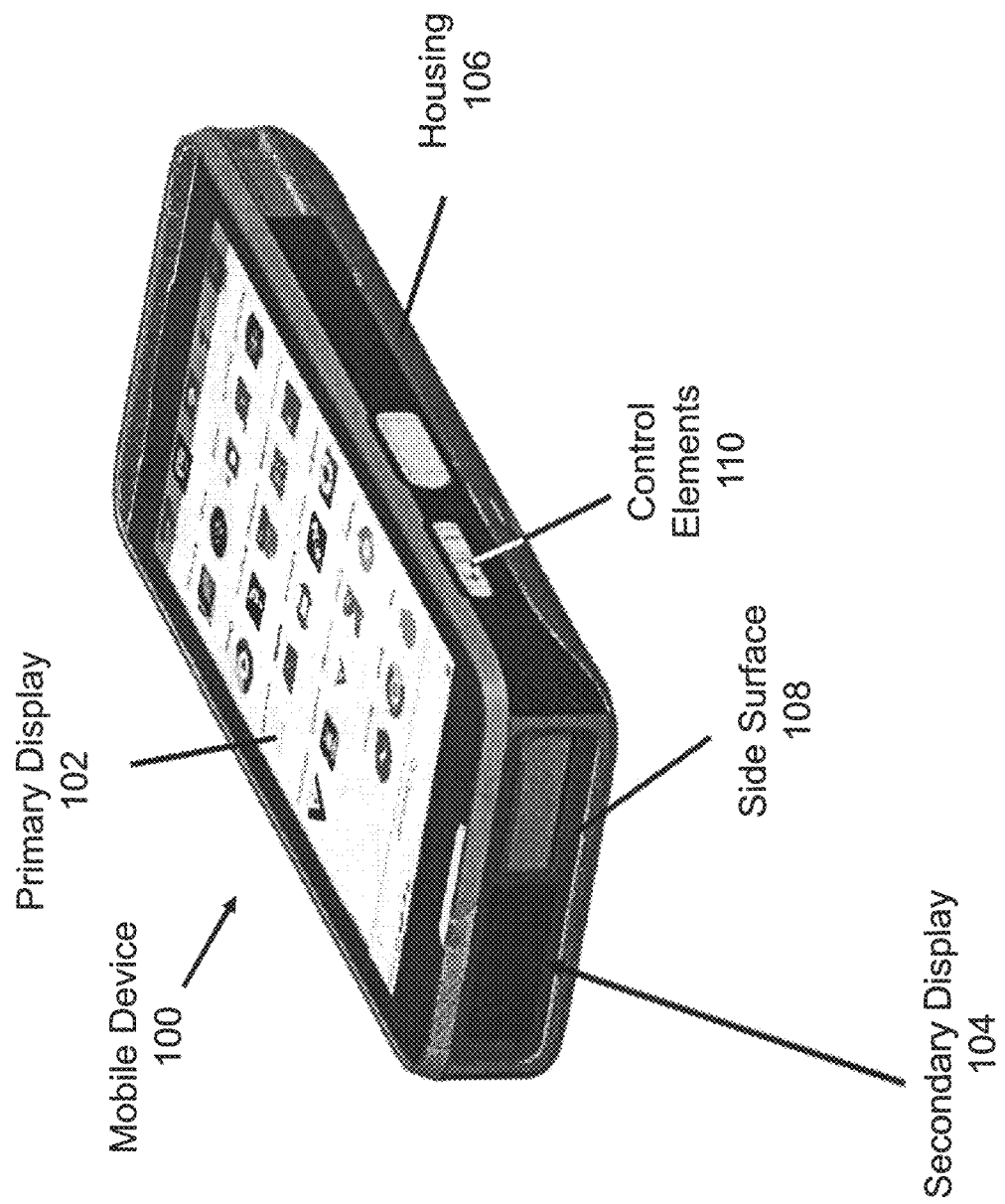
FIG. 1 is an illustration of an illustrative mobile device that includes a primary electronic display configured to be support debugging of software being executed thereon.

With regard to FIG. 1, an illustration of an illustrative mobile device 100 that includes a primary electronic display 102 configured to be support debugging of software being executed thereon is shown. The mobile device 100 may be a smart phone or any other mobile electronic device, including consumer, commercial, or industrial mobile device. The mobile device 100 may include a processor that is configured to execute a mobile operating system, such as Android, iOS, Windows, RTOS, or any other operating system.

As shown, the secondary electronic display 104 may be configured on a housing 106 that may be configured to house the mobile device 100. As further described herein, software instructions may (i) continually operate on the processor of the mobile device 100 to identify exceptions inclusive of debug traps capable of intercepting anomalous situations and (ii) redirect assertions to be displayed on the secondary display 104.

The secondary display 104 may be disposed on a side surface 108 of the housing 106, in this case a surface that aligns with a top side of the mobile device 100. It should be understood that the secondary display 104 may be positioned on any side or rear surface of the housing 106. It should be understood, however, that the secondary display 104 may alternatively be positioned external from the housing 106, such as being a separate device altogether, but that receives communications from the mobile device 100 via a wire or wirelessly that is not intrusively a wired or wireless communications means. However, because of the nature of problems that occur on mobile devices when software hangs up hardware, it is possible for a wireless communications port to be inoperable such that the secondary device 104 is more reliably connected via a wired communications port, as further provided herein. The secondary display 104 may be any type of electronic display, including LCD, LED, OLED, or any other technology, as understood in the art. Moreover, the secondary display 104 may be touch sensitive or non-touch sensitive. In the event of the secondary display 104 being non-touch sensitive, control elements 110, such as volume buttons, may be used for controlling operation of information (e.g., messages including exception codes) being displayed on the secondary display 104. In an embodiment, if the primary electronic display 102 is still operative, then the primary electronic display 102 may provide for control over the secondary electronic display 104.

Figure 2:
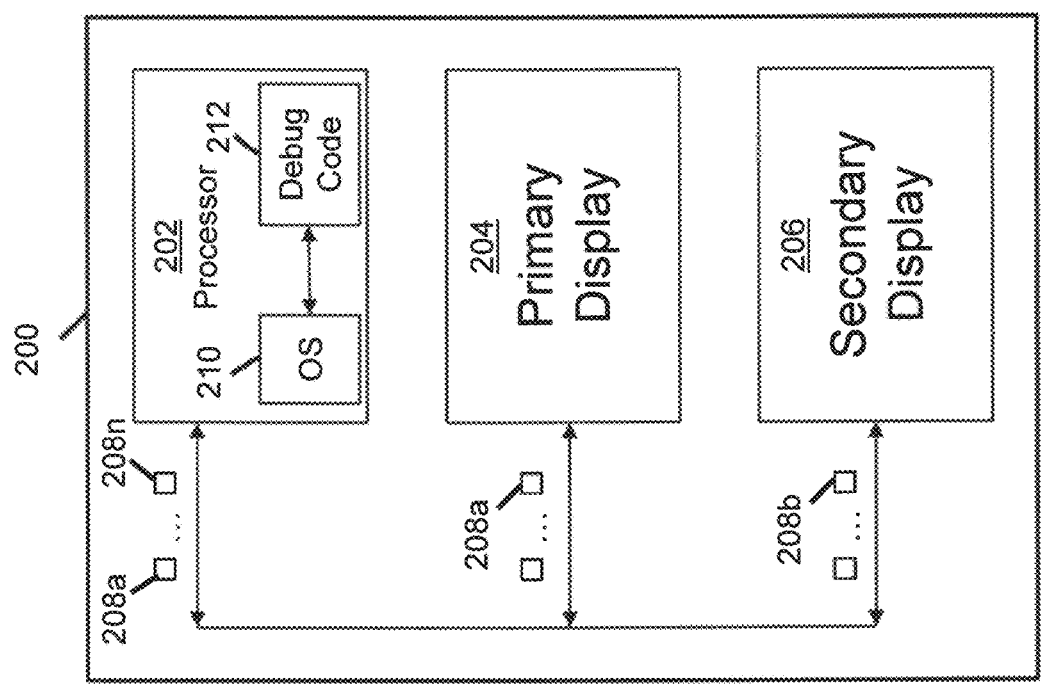
FIG. 2 is an illustration of an illustrative mobile device.

With regard to FIG. 2, an illustration of an illustrative mobile device 200 is shown. The mobile device 200 includes a processor 202 that may be composed of one or more computing devices configured to execute instructions to perform various functions of a mobile device. A primary display 204 may be an electronic display that is typically included with a mobile electronic device, such as a smartphone or any other application-specific mobile device, as understood in the art. That is, the primary display 204 is part of the mobile device 200 as originally sourced by the manufacturer of the mobile device 200. A secondary display 206 may be added to or incorporated with the mobile device 200. For example, the secondary display 206 may be mounted to the mobile device 200 by using a housing or other structure that removably engages at least a portion of the mobile device 200, such as shown in FIG. 1. Other configurations in which the secondary display 206 is permanently, removably, or not attached to the mobile device 200 may be utilized, as well.

In operation, the processor 200 may be in communication with the primary display 204 and secondary display 206. In an embodiment, an operating system (OS) 210 that executes on the processor 202 may also be configured to control operations of the primary display 204. In accordance with the principles described herein, the secondary display 206 may be configured to operate independent of the operating system being executed by the processor 202, and be limited to being responsive to debug software code (e.g., print error messages) that is being executed by the processor 202. In an alternative embodiment, the secondary display 206 may additionally be configured to interact with the operating system 210 when the mobile device 200 is not operating in a debug mode.

The processor 202 may be configured to output data packets 208a-208n (collectively 208) for communication of data and/or instructions to either or both of the primary display 204 and secondary display 206. The data 208 may include any data that is typically communicated for display on the primary display 204. For example, the data may include graphics, text, images, Windows, and/or any other data format and/or content typically presented on mobile devices with users thereof. In an embodiment, the primary display 204 is a touch sensitive display such that data 208a is communicated between the processor 202 and primary display 204 in a bi-directional manner. In one embodiment, the secondary display 206 may be touch sensitive such that data 208b may be communicated bi-directionally with the processor 202 and the secondary display 206. In the event that the secondary display 206 is not touch sensitive, then the data 208b may only flow from the processor 202 to the secondary display 206 for display thereon. As will be described further herein with regard to FIGS. 4 and 5, the processor 202 may include one or more core processors (FIG. 4) or a multi-core processor (FIG. 5). In either case, the processor 202 may be configured to execute operating system 210 and debug code 212, but possibly in different configurations. The operating system 210 and debug code 212 may be in communication with one another. Alternatively, the debug code 212 may be independent of the operating system 210 entirely such that the debug code may remain entirely independent from the operating system code 210.

Figure 3:
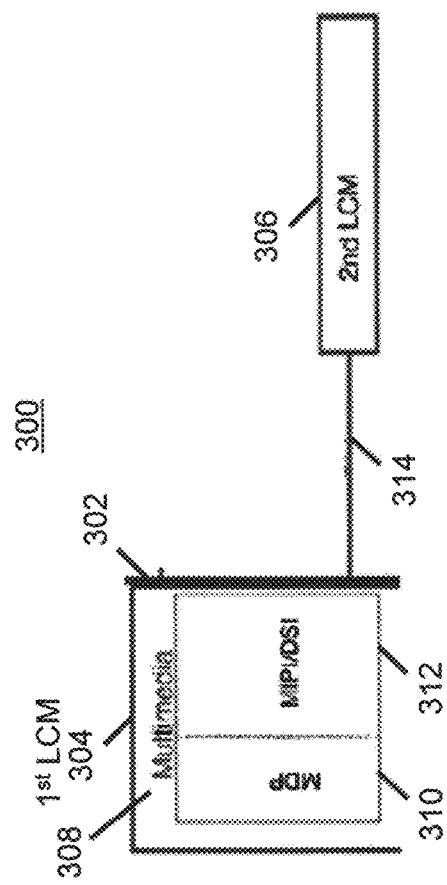
FIG. 3 is an illustration of an illustrative mobile device assembly inclusive of a mobile device including a first display, such as a liquid crystal monitor (LCM), and second display.

With regard to FIG. 3, an illustration of an illustrative mobile device assembly 300 inclusive of a mobile device 302 including a first display 304, such as a liquid crystal monitor (LCM), and second display 306, such as a liquid crystal monitor, is shown. The first LCM 302 may be onboard the mobile device 302, and be configured to display multimedia 308, as understood in the art. In displaying the multimedia 308 on the LCM 304, commands and data may be communicated to the LCM via a mini display port (MDP) 310 and/or mobile industry processor interface/digital serial interface (MIPI/DSI) 312. In an embodiment, the second LCM 306 may be in communication with the mobile device 302 via a wired or wireless communications path 314 (e.g., serial peripheral interface (SPI)). It should be understood that a wide range of interface types and communications protocols may be utilized to enable communication of commands and data to either or both of the first and second LCMs 304 and 306. The communications protocol between the mobile device 302 and second LCM 306 may be independent of full control of the operating system of the mobile device 302 so as to avoid or minimize loss of communications between the mobile device 302 and second LCM 306 in the event of the mobile device 302 freezing up, thereby enabling a developer or other user to have exceptions displayed on the second LCM 306 in response to an error of the mobile device 302.

Figure 4:
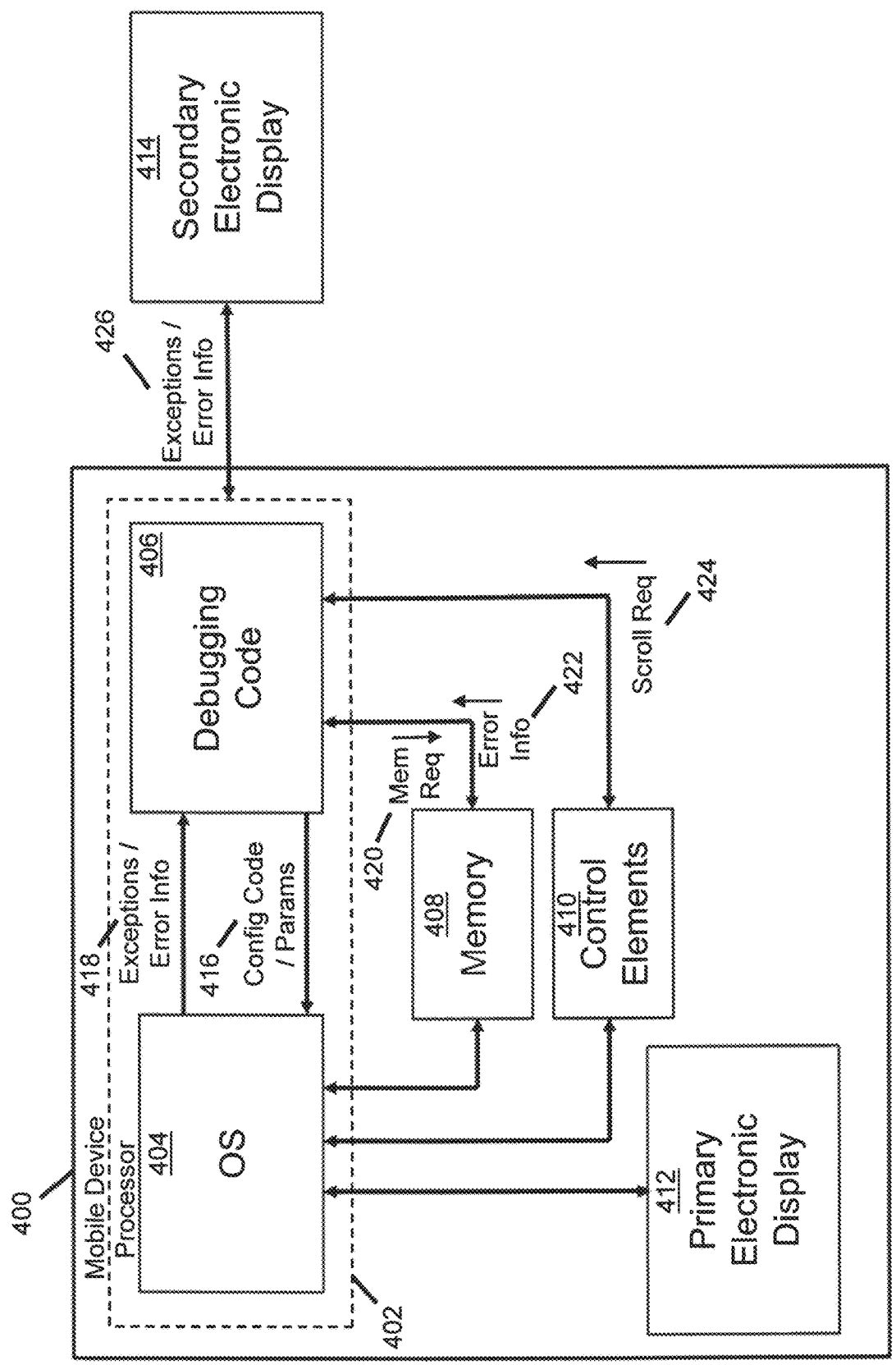
FIG. 4 is an illustration of illustrative mobile device that includes a processor configured to be used for debugging software.
Figure 5:
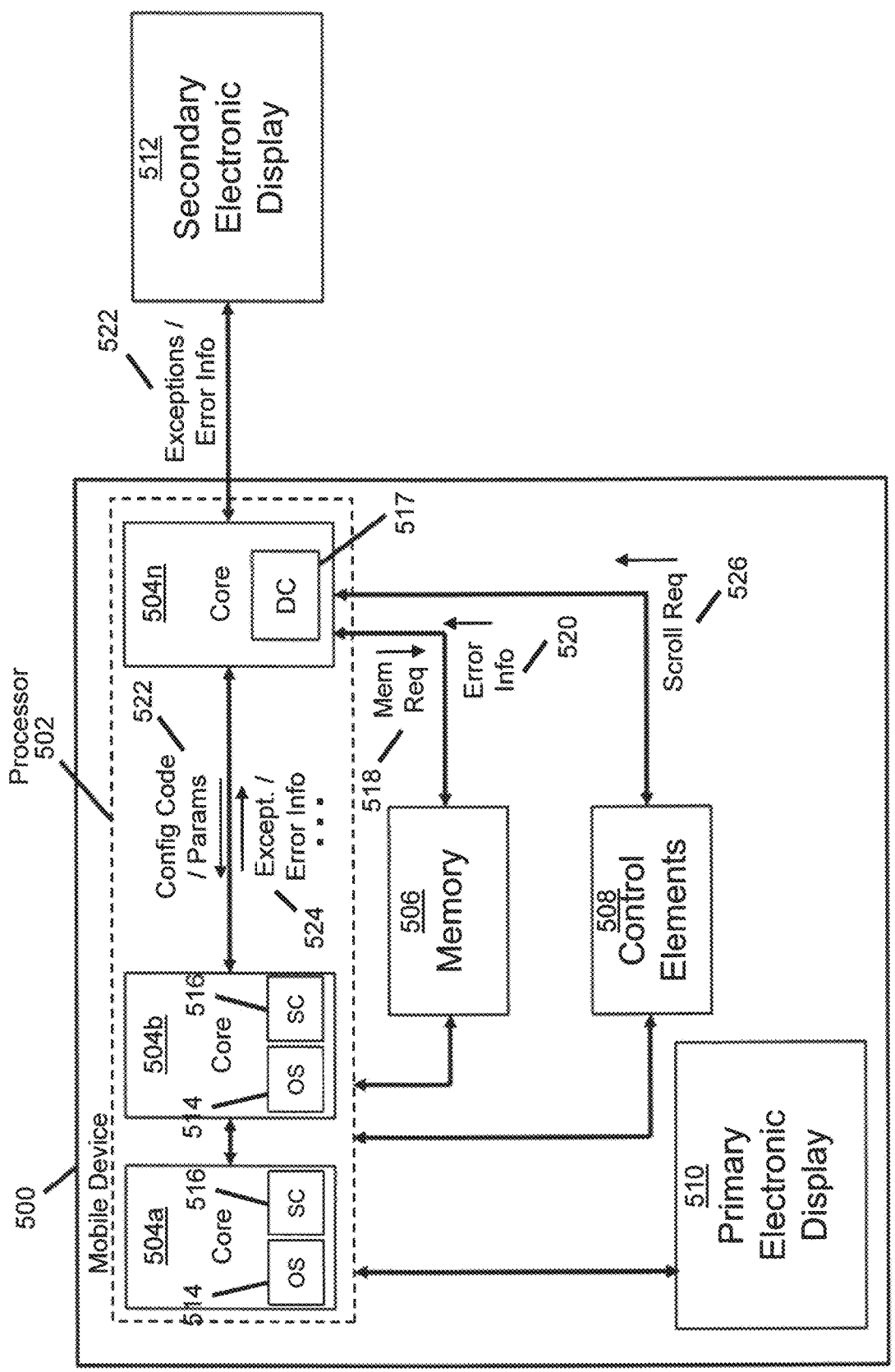
FIG. 5 is an illustration of an illustrative mobile device including a processor including multipole cores.

With regard to FIG. 4, an illustration of illustrative mobile device 400 that includes a processor 402 configured to be used for debugging software is shown. The processor 402 may execute an operating system 404 and debugging code 406. The mobile device 400 may include memory 408 configured to store software and/or data used by the mobile device 400. Control elements 410, which may include volume buttons, home button, thumb print sensor, accelerometer, gyroscope, microphone, ON/OFF button, and/or any other hardware component used for controlling operation of the mobile device 400. A primary electronic display 412, which is often a touchscreen, may be provided, as well. The primary electronic display 412 may also be considered one of the control elements 410. The processor 402 may be in communication with each of the memory 408, control elements 410, and primary electronic display 412. In accordance with the principles described herein, a secondary electronic display 414 may be in electrical communication with the processor 402, and be utilized for debugging and/or other purposes, as further provided herein.

The debugging code 406 may be configured with self-checking code, printing code, and advanced debugging code, and be configured to trap exceptions and information associated therewith, to print the exceptions and/or information, and to support debugging functionality. More specifically, the debugging code 406 may be configured to identify exceptions or assertions by performing a self-check using a query or otherwise direct the operating system for a status, and, in response, display information associated with the status of the operating system on the secondary electronic display. As shown, the debugging code 406 may communicate configuration code and/or parameters 416 with the operating system 404 such that the operating system 404 communicates information to the debugging code 406 in the form of exceptions and/or other assertion information 418 in response to the operating system 404 determining that an error occurred. The parameters 416 may be any data that is use by the operating system to flag and communicate the exceptions/error information 418 to the debugging code 406. In an embodiment, the debugging code 406 may simply query the operating system 404 or the main processor (e.g., registers, memory, etc.) for any status information (e.g., exceptions/error information) in response to an exception occurring. The exception and/or other information 418 may include any information that may be helpful to a developer to understand an error that occurred during development, deployment, or otherwise of a software program (e.g., mobile app) and/or hardware device.

The debugging code 406 may also have direct communications with the memory 408 and control elements 410. In response to an exception being received by the debugging code 406, the debugging code 406 may communicate a memory request 420 to access error and/or state information 422 stored in the memory 408. The error information 422 include an error ID, exception ID, stack ID, software statement, last module call, or any other information that may be helpful to debug software, as further provided herein. In addition, control elements 410 may communicate a scroll request signal 424 to the debugging code 406 in response to a user activating one or more of the control elements 410 to enable a user to scroll through information being displayed on the secondary electronic display 414. Exceptions and/or other information 426 may be communicated to the secondary electronic display 414 and displayed thereon. The secondary electronics display 414 may display single lines of text for each error code, for example, in the event that the secondary electronic display 414 is height limited. It should be understood that the secondary electronic display 414 may have any number of configurations such that more than a single line of text may be displayed simultaneously. In either case, the control elements 410, which may include up-and-down volume buttons, may enable the user to scroll through multiple lines of information (e.g., stack history) available for display on the secondary electronic display 414.

More particularly, the secondary electronic display 414 may be managed by the operating system 404 and without reserving a specific core when not possible or not efficient. Such a configuration less reliable from a debugging point-of-view, but still presents some advantages because the level of interface is straightforward and works if the operating system 404 is not fully broken or frozen. It should be noted that the secondary electronic display 414 is local to the mobile electronic device 400, and connected via a simple electrical interface (e.g., I2C, SPI, serial port, or otherwise), and may not need any additional communication or operating system resources to be connected after an error event occurs. That is, while it is possible to avoid having to use the operating system for interfacing with the secondary electronic display 414, it is also possible despite not necessarily being an ideal technique, as previously described herein. Using a simple electrical interface is particularly helpful when the device becomes in the "stone state." The developer can do a redirect assertion information to the secondary electronic display 414 before crashing. The same cannot be done easily with the main display since the primary electronic display 412 has to rely on calls from the operating system 404 that may not be working properly in the event of an error occurring.

Since the secondary electronic display 414 is local and always present, the reserved core if allocated (or the processor 402 or CPU, if still running) can share whatever information that is useful for tracing or debugging even if there is not a full block or stoppage of the processor 402. In some embodiments, the secondary electronic display 414 may show running threads, memory, stacked usage, and other our information or operational information without affecting the primary electronic display 412. Quite often, many error conditions occur as a result of interfacing with the primary electronic display 412, so if the primary electronic display 412 becomes locked, the secondary electronic display 414 is particularly helpful to have operating in these error conditions. With the secondary electronic display 414, error events can be traced and analyzed by capturing certain information and displaying that information on the secondary electronic display 414. Even in the case where no special core is allocated and the processor 402 is fully frozen (i.e., dead), the secondary electronic display 414 may be used to show exception handler information that caused the error (e.g., a line of the software code and file name causing and assertion that generates the failure). As an example, if the mobile device 400 runs out of available memory in the memory 408, the processor 402 will likely generate an exception, which is indicative of a failure, in this case and out-of-memory error code. The exception (e.g., error code) may be reported in the secondary electronic display 414. In this way, trace information about the exception causing the issue may be made available to the developer, which would otherwise not be available due to the primary electronic display 412 being frozen. As further provided in FIG. 5, additional debug options are even more prevalent when a core is dedicated to managing the debugging code. The basic idea is to implement a low-level implementation of the secondary electronic display 414 without affecting the operating system 404 by enabling the debugging code 406 to access exceptions and/or error information from the operating system 404, if still executing, and/or memory 408.

For the undedicated core embodiment provided in FIG. 4, the following algorithm may be utilized:

(i) Redirect assertions, which are indications when preconditioned call controls are not verified, events, exceptions, to the secondary electronic display 414. The redirection may be performed through an "intrusive" and blocking simple printf function, which is a function to print potential operations in an abnormal mode, exceptions. A function that is able to stop everything and ensure that the exception statement is written into the secondary electronic display 414, thereby ensuring the information is shown in the secondary electronic display 414.

(ii) Proper self-checking code may be written and continually run inside the processor 402 during the normal device working activity without degrading the performance of the default code execution of the default code devoted to the default device activities. The self-checking code may continuously verify the presence of anomalous pathological situations and in such a case, the debugging code may take control and intrusively write debug information into the secondary electronic display 414 by means of the printf function. For example, a check that a call precondition is true for the debug function, which can be performed by adding an Assert( ) function or any other error handler component for checking the relevant input preconditions and post-conditions of the functions (e.g., parameters, memory, and so on); and (iii) The self-checking code may be added inside default code being executed on the processor 402 in the form of proper debug traps capable of intercepting anomalous situations.

The process may be easier to implement with respect to the multi/dedicated core solution of FIG. 5. However, the multicore solution of FIG. 4 may be limited to detecting only a single anomalous condition and to display the condition in the secondary electronic display 414. If the device thereafter dies, it is not possible to detect other debug information.

With regard to FIG. 5, an illustration of an illustrative mobile device 500 including a processor 502 including multiple cores 504 (i.e., multicore processor 502) is shown. The multiple cores 504a-504n are configured to operate independently so that the processor 502 can perform a large number of small tasks, as understood in the art. The multicore processor 502 may be in communication with a memory 506 and control elements 508 in the same or similar manner as the processor 402 in FIG. 4. The mobile device 500 may further include a primary electronic display 510, and be in communication with a secondary electronic display 512.

In this embodiment, the multicore processor 502 may have cores 504a-504m execute an operating system 514 to handle operations on each of the cores 504a-504m, and reserve one of the cores, in this case core 504n, to handle printing to the secondary electronic display 512 via a communications bus (e.g., I2C, SPI, wireless, etc.) that is independent of the operating system 514. Self-checking code or assertion system 516 may be configured executed by the cores 504a-504m to monitor for errors and/or assertions, and debugging code 517 may be configured to handle collection of the assertions and/or status of the cores 504a-504m and/or other electronic components of the mobile device 500. For clarification purposes, the self-checking code 516 is meant to operate while the cores 504a-504m are operating (i.e., pre-mortem), while the debugging code 517 is meant to operate during and after operation of the cores 504a-504m (i.e., post-mortem). The debugging code 517 is meant to help determine what happened to the core(s) 504a-504m after a crash thereof by the dedicated core 504n.

The operating system 514 may be configured to operate the mobile device 500, while the self-checking code 516 and debugging code 517 may be used to handle debugging operations, as further described herein. By having the debugging code 517 executed in a reserved core (i.e., one that is independent of the operating system 514), the debugging code 517 may continue to execute even if one or more of the other cores 504a-504m stop operating properly due to an error occurring. Moreover, if one of the cores 504 is dedicated, that dedicated core is not managed by the operating system 514 and, thus, not seen as an operating system driver. As a result, the electrical interface could be simplified as a result of not having to interact with the operating system 514. As such, the dedicated core 504n may access the memory 506 at any time so as to read the state of the registry, program counter (PC), stack pointer, running threads or dead, internal state of the operating system 514 and processor 502 and/or cores 504a-504m, and so on. In operation, the debugging code 517 may access the memory 506 independent of the operating system 514 by sending a memory request 518 to the memory 506, and information, such as error information 520 being stored in the memory 506 (e.g., current status stored in an execution stack) may be returned to the core 504n. Moreover, the core 504n may communicate directly with the other cores 504a-504m to determine operations, such as current processes being executed by the cores 504a-504m.

In an embodiment, the core 504n may communicate a configuration code/parameters 522 to the self-checking code 516, for example, being executed on one or more of the cores 504a-504m to set traps or other instructions or parameters for the cores 504a-504m to communicate debugging information to the core 504n. An exception/error information 524 may be communicated to the core 504n from any of the cores 504a-504m in response to an exception indicative of an error occurring being created. The core 504n may communicate exception/core information to the secondary electronic display 512 for display thereon. The core 504n, which is in communication with the control elements 508 independent of the operating system 514, may enable a user to scroll through messages being displayed or available to be displayed on the secondary electronic display 512 in response to a user activating one or more control elements 508, which may communicate a scroll request signal 526 to the debugging code 517 even if one or more of the cores 504a-504m and/or primary electronic display 510 is frozen (e.g., white or black screen).

Furthermore, pre-mortem debug can be applied in both the two embodiments shown in FIG. 4 and FIG. 5. Since FIG. 4 is configured such that both the operating system and debugging code 406 are executed by the same core, the possibility that the debugging code 406 will operate after crash of the core is less likely. However, the post-mortem debug code 517 being executed by specific core in case of FIG. 5 and may also be also be utilized in the embodiment of FIG. 4 if the system is not completely dead. Again, in the case of FIG. 4, there is no certainty, but the functionality of the post-mortem debug code may still be functional in some cases.

For the dedicated core embodiment provided in FIG. 5, the following algorithm may be utilized:

(i) establish a dedicated core, which may a core configured for general purposes on the mobile device 500 or a core specially devoted for debug purposes, such as generally established for a camera, for example. By using a dedicated core, the core remains alive even when the rest of the device is down.

(ii) implement the following two potential policies:
(a) round robin: execute a full verbose dump of all the diagnostic messages at disposal from the device so as to show information about what happened during the abnormal situation;
(b) polling: pole the alive core in order to retrieve specific information related to some specific items;

(iii) enable user controlled triggering commands by an operator with predefined events (e.g., keys, accelerometers, etc.) to allow a very detailed visualization of deep information about the state of the machine, tracers, the past events, state of the OS threads, memory, running threads, possible warnings, etc.

The use of this algorithm allows for retrieval of a higher debug level with respect to the debugging process of FIG. 4.

The algorithm of FIG. 5 represents a more interactive debug instrument with respect to the solution of FIG. 4 since the dedicated core, which remains alive, is able to retrieve a significant amount of useful information from the shared memory 506 of the device. However, as previously described, the possibility of the solution of FIG. 4 operating after an error is also possible. The debugging configuration of FIG. 5 may be more complex to implement than that of FIG. 4, however, and there could be limitations or constraints to manage from the perspective of managing initiation of the operating system the multicore platform.

In either the non-dedicated core (FIG. 4) or dedicated core (FIG. 5) scenario, when a single operating system thread is killed, the cause of the error is very difficult to identify without a debugger, emulator, or specific software. When the secondary electronic display is configured to operate in a debug mode (i.e., debugging software is being executed and is able to output messages indicative of the error), the debugging software may continually update a state of running threads or warn that one thread was killed or halted. It should be understood that the pre-mortem debug system (i.e. assertions of preconditions, error handler . . . ) is normally enabled by default, while an additional debug mode may be enabled in case of need due to other fault communications being impossible, as described herein. The same approach may be used to monitor may other variable states of the mobile device that are not working properly.

A debug mode for the mobile devices may be initiated in a variety of different ways. A non-limiting list of techniques for entering the debug mode may include:

(a) through a configuration system (e.g., hidden parameter that allows for a temporary or permanent debug mode state;
(b) automatic when an error handler generates an exception; by default, assertions are always controlled and exceptions may be automatically printed in the secondary electronic display independent of any specific and explicit enabling;
(c) using an event associated with an accelerometer (e.g., specific up-down-up sequence);
(d) pressing a scan trigger for a very long time (e.g., 1 minute or longer);
(e) pressing a combination of keys or button(s);
(f) performing an action on one or more peripherals;
(g) reading any of a unique barcode, NFC tag, Wi-Fi communication, Bluetooth, or fingerprint.

In both cases, a determination may be performed to enable an advanced debug mode, which means that the advanced debug mode may be enabled either when the mobile electronic device 500 is working properly or when an exception is raised and the device 500 appears as being dead. Even when the device is not in an exception situation, it be beneficial to enable the advanced debug mode (i.e., not the self-checking or assertion system 516, but the debugging code 517) to help the user see how the cores 504a-504m operate normally or in different situations. If the device gets frozen after an exception beside a possible assertion print, an attempt may be made to enter the advanced debug mode, such as a post-mortem debug. There are two configurations, (i) a dedicated core, and (ii) standard use of the cores. In the dedicated core configuration, it is assured that the advanced debug mode can run, but in the non-dedicated core configuration, being able to execute the advanced debug mode is non-determinative as it depends if any of the cores are still live or all of the cores are dead.

If the secondary electronic display is being used for a standard function, the secondary electronic display may be controlled thereafter by the debugging code. It should be understood that the debugging feature may be available during the entire life of the product, and not only during development. It should further be understood that the debugging feature may be integrated into the mobile devices so that in the event that errors are occurring, a user or technician (or developer) may be able to obtain error information to assist with debugging the software and/or hardware by using the hidden technique to initiate the debug mode.

One embodiment of a method described herein may include executing a software program and self-checking software instructions by a processor of a mobile electronic device including a primary electronic display. The processor may be in communication with the primary electronic display. A secondary electronic display may be executed and in communication with the processor. The processor may be configured to execute the self-checking software instructions such that in the event of an exception occurring, the processor may be caused to display at least one message inclusive of information to assist a user with debugging the software program on the secondary electronic display.

Displaying the message(s) may include displaying a current state of the mobile electronic device. The process may further include identifying a user-initiated event, and transitioning the processor to a debugging mode to enable displaying of the message(s) to the secondary electronic display. Displaying the message(s) may include displaying an error code.

The process may further include automatically switching to a debug mode in response to an exception occurring, and tracing the exception information for display on the secondary electronic display. The traced exception information may be displayed. The secondary electronic display may be accessed via an operating system being executed by the processor. The secondary display may be enabled to scroll through the messages in response to a user pressing a volume button of the mobile electronic device. The processor may further be configured to enable the user to step through multiple messages in response to a user touching the secondary electronic display that is touch sensitive. In an embodiment, the self-checking software instructions may be executed on each of multiple cores on which the operating system is running, and, responsive to an exception occurring, the message(s) may be displayed by a printing procedure by debugging code on the secondary electronic display.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A system, comprising:
a mobile electronic device including:
a primary electronic display;
a secondary electronic display; and
a processor in communication with the primary electronic and the secondary electronic display, the processor executing software that continually runs self-checking code during normal working activity of the processor, and in the event of an execution error of a software program or hardware component identified by the self-checking code, causes at least one message inclusive of information to assist a user with a debugging process to be displayed on the secondary electronic display in response to the execution error identified by the self-checking code.

2. The system according to claim 1, wherein the information includes a current state of the mobile electronic device.

3. The system according to claim 1, wherein the processor is configured to identify a trigger by a user and automatically cause the secondary electronic display to receive the at least one message.

4. The system according to claim 1, wherein the information includes an error code.

5. The system according to claim 1, wherein the processor is further configured to (i) automatically switch to a debug mode in response to an exception occurring and (ii) trace the exception information for display on the secondary electronic display.

6. The system according to claim 5, wherein the processor is further configured to display the exception information.

7. The system according to claim 1, wherein the secondary electronic display is accessible via an operating system being executed by the processor.

8. The system according to claim 1, wherein the secondary display is configured to scroll through the messages in response to a user pressing a user-interface button of the mobile electronic device.

9. The system according to claim 1, wherein the secondary electronic display is touch sensitive, and wherein the processor is further configured to enable the user to step through multiple messages in response to a user touching the secondary electronic display.

10. The system according to claim 1, wherein the processor includes a plurality of cores, and wherein one core of the multi-core processor is dedicated to the self-checking code and debug and/or trace operation of the other cores that are dedicated to the normal working activity of the mobile electronic device, and wherein the one core is further configured to control the display of the at least one message on the secondary electronic display.

11. A method, comprising:
executing a software program and self-checking software instructions by a processor of a mobile electronic device including a primary electronic display, the processor being in communication with the primary electronic display; and
operating a secondary electronic display in communication with the processor, the processor executing the self-checking software instructions continually in background of normal working activity of the mobile electronic device such that in the event of an exception occurring, causing the processor to display at least one message inclusive of information to assist a user with a debugging process on the secondary electronic display responsive to the self-checking software identifying the exception.

12. The method according to claim 11, wherein displaying the at least one message includes displaying a current state of the mobile electronic device.

13. The method according to claim 11, further comprising:
identifying a user-initiated event; and
transitioning the processor to a debugging mode to enable displaying of the at least one message to the secondary electronic display.

14. The method according to claim 11, wherein displaying the at least one message includes displaying an error code.

15. The method according to claim 11, further comprising:
automatically switching to a debug mode in response to an exception occurring; and
tracing the exception information for display on the secondary electronic display.

16. The method according to claim 15, further comprising displaying the traced exception information.

17. The method according to claim 11, further comprising accessing the secondary electronic display via an operating system being executed by the processor.

18. The method according to claim 11, further comprising enabling the secondary display to scroll through the messages in response to a user pressing a user-interface button of the mobile electronic device.

19. The method according to claim 11, further comprising enabling the user to step through multiple messages in response to a user touching the secondary electronic display that is touch sensitive.

20. The method according to claim 11, further comprising executing debugging software instructions on one of a plurality of cores dedicated to the self-checking software as opposed to other cores of the plurality dedicated to the normal working activity of the mobile electronic device, and, responsive to an exception occurring as identified by the self-checking software instructions, displaying the at least one message on the secondary electronic display by the debugging software instructions.

* * * * *